(12) United States Patent
Yang et al.

(10) Patent No.: US 11,342,836 B2
(45) Date of Patent: May 24, 2022

(54) OVERVOLTAGE PROTECTION FOR ACTIVE CLAMP FLYBACK CONVERTER (71) Applicant: Silergy Semiconductor Technology (Hangzhou) LTD, Hangzhou (CN)

(72) Inventors: Xiangdong Yang, Hangzhou (CN); Yongjiang Bai, Hangzhou (CN); Jie Ding, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 16/835,622

(22) Filed: Mar. 31, 2020

(65) Prior Publication Data
US 2020/0328669 A1    Oct. 15, 2020

(30) Foreign Application Priority Data

Apr. 15, 2019   (CN) .......................... 201910300835.1

(51) Int. Cl.
*H02M 1/32*   (2007.01)
*H02M 1/08*   (2006.01)
*H02M 3/335*  (2006.01)

(52) U.S. Cl.
CPC .............. *H02M 1/32* (2013.01); *H02M 1/08* (2013.01); *H02M 3/33569* (2013.01); *H02M 1/322* (2021.05)

(58) Field of Classification Search
CPC .......... H02M 1/32; H02M 1/08; H02M 1/322; H02M 1/344; H02M 3/33569; H02M 3/33507; H02M 3/33523
See application file for complete search history.

(56) References Cited

U.S. PATENT DOCUMENTS

| | | | |
|---|---|---|---|
| 5,528,481 A | 6/1996 | Caldeira et al. | |
| 8,310,846 B2 | 11/2012 | Piazzesi | |
| 8,917,068 B2 | 12/2014 | Chen et al. | |
| 9,331,588 B2 | 5/2016 | Chen | |
| 9,762,113 B2 | 9/2017 | Chen et al. | |
| 10,148,188 B2 | 12/2018 | Koo et al. | |
| 2015/0078041 A1 | 3/2015 | Huang | |
| 2015/0311810 A1 | 10/2015 | Chen et al. | |
| 2017/0047853 A1 | 2/2017 | Chen et al. | |
| 2018/0069480 A1* | 3/2018 | Koo ................... | H02M 3/33523 |

FOREIGN PATENT DOCUMENTS

CN   102122890 A   7/2011

* cited by examiner

*Primary Examiner* — Kyle J Moody
*Assistant Examiner* — Jye-June Lee (57) ABSTRACT An apparatus including: a switching converter having a main switch configured to provide power to a transformer, an auxiliary switch configured to provide a release path for leakage inductance energy of the transformer, and a clamp capacitor coupled in series with the auxiliary switch; and a control circuit configured to control the main switch to be off and the auxiliary switch to operate to discharge the clamp capacitor when in an over-voltage protection mode. A method of controlling the switching converter can include: controlling the main switch to be off; and controlling the auxiliary switch to operate to discharge the clamp capacitor when in an over-voltage protection mode.

18 Claims, 8 Drawing Sheets

FIG. 1
(conventional)

OVERVOLTAGE PROTECTION FOR ACTIVE CLAMP FLYBACK CONVERTER

RELATED APPLICATIONS

This application claims the benefit of Chinese Patent Application No. 201910300835.1, filed on Apr. 15, 2019, which is incorporated herein by reference in its entirety.

FIELD OF THE INVENTION

The present invention generally relates to the field of power electronics, and more particularly to switching converters, and associated control circuits and methods.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In some approaches, a clamp control method can be used in order to absorb a spike voltage in a switching converter. The switching converter can include a main switch and an auxiliary switch, where both the main switch and the auxiliary switch are coupled to a primary winding of a transformer. In addition, the main switch and the auxiliary switch may alternately turned on and off in a complementary way. During an off-state of the main switch, the auxiliary switch can be turned on, thereby an additional absorbing circuit may be formed to absorb the energy stored in the leakage inductance of the primary winding, such that generation of spike voltage can be suppressed.

Figure 1:
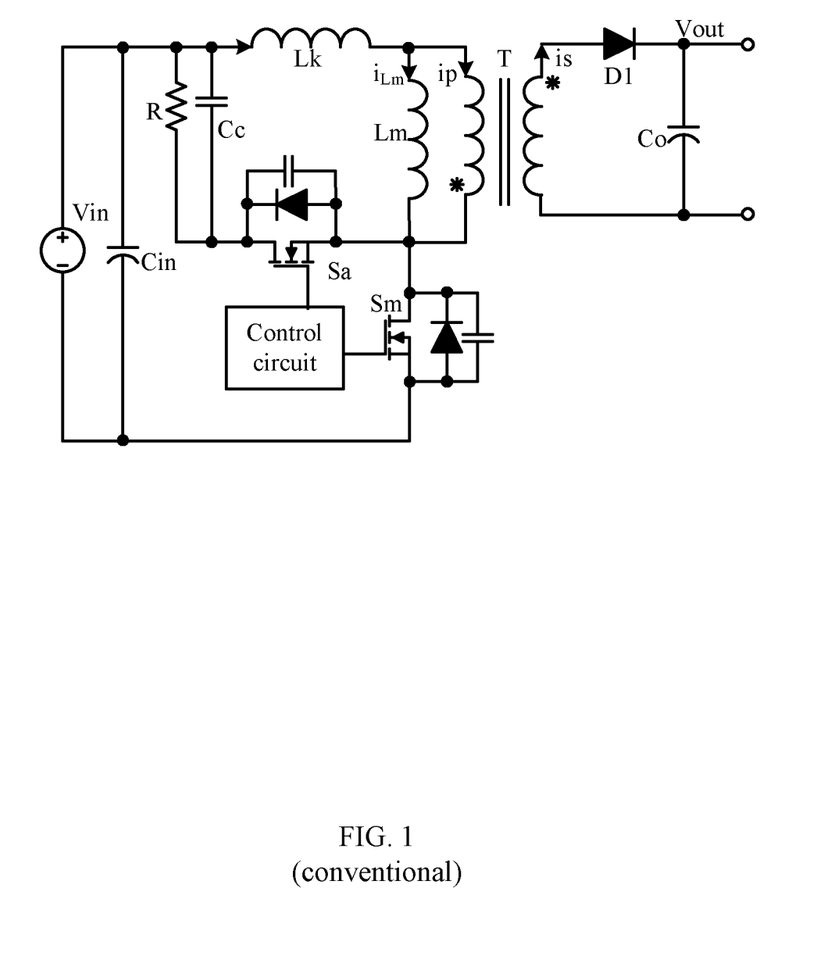
FIG. 1 is a schematic block diagram of an example active-clamp flyback circuit.

Referring now to FIG. 1, shown is a schematic block diagram of an example active-clamp flyback circuit. In this example, when over-voltage protection starts due to faults, such as over-voltage of the output voltage of the active-clamp flyback circuit, both main switch Sm and auxiliary switch Sa may be turned off. Thus, there may be no discharge circuit for clamp capacitor Cc, and the voltage of clamp capacitor Cc can drop slowly, while output voltage Vout of the active-clamp flyback circuit may quickly be pulled down by the load. When over-voltage protection is cleared or restarted, the voltage of primary winding may be low due to the low output voltage Vout. When auxiliary switch Sa is turned on, the voltage of leakage inductance Lk equal to a voltage difference between the voltage of clamp capacitor Cc and the voltage of primary winding may be relatively high, and the inductance value of leakage inductance Lk may be relatively small. Thus, a large loop current flowing through primary winding can be generated according to a relationship between inductance voltage and inductance current (e.g., Ldi/dt=u). In addition, the peak current of secondary diode D1 may be relatively large, and therefore auxiliary switch Sa and secondary diode D1 can possibly be damaged.

In some approaches, a discharge circuit can be provided by connecting a large resistor R in parallel across clamp capacitor Cc. For example, when over-voltage protection starts, main switch Sm and auxiliary switch Sa may both be turned off, and clamp capacitor Cc can discharge within a preset fixed time. However, resistor R is a fixed load, and although resistor R can absorb the spike voltage, the energy consumed by the discharge circuit can cause the no-load power consumption of the switching converter to increase, which can reduce the efficiency.

In one embodiment, an apparatus can include: a switching converter having a main switch configured to provide power to a transformer, an auxiliary switch configured to provide a release path for leakage inductance energy of the transformer, and a clamp capacitor coupled in series with the auxiliary switch; and a control circuit configured to control the main switch to be off and the auxiliary switch to operate to discharge the clamp capacitor when in an over-voltage protection mode. In one embodiment, a method of controlling the switching converter can include: controlling the main switch to be off; and controlling the auxiliary switch to operate to discharge the clamp capacitor when in an over-voltage protection mode.

Figure 2:
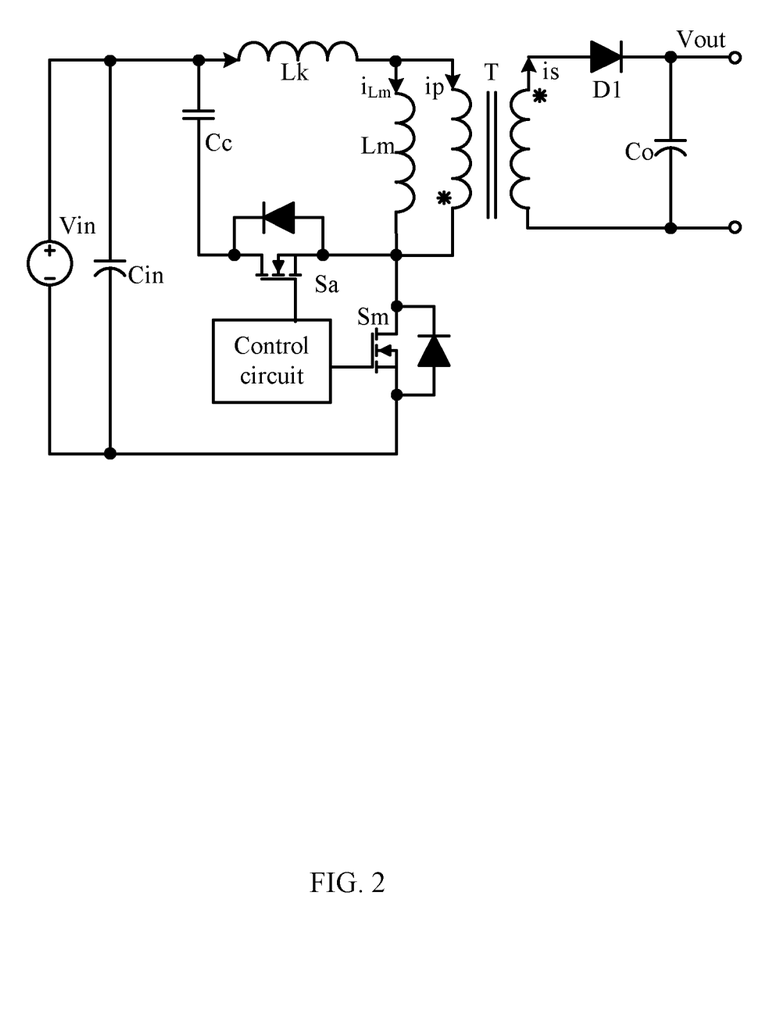
FIG. 2 is a schematic block diagram of a first example active-clamp flyback circuit, in accordance with embodiments of the present invention.

Referring now to FIG. 2, shown is a schematic block diagram of a first example active-clamp flyback circuit, in accordance with embodiments of the present invention. In particular embodiments, the switching converter can be an active-clamp flyback circuit, an active-clamp forward circuit, or any other suitable type of switching converter. In this example, active-clamp flyback circuit can include input capacitor Cin, a power stage circuit, a clamp circuit, and a control circuit. In some cases, the active-clamp flyback circuit can also include a rectifier bridge to rectify a received external input voltage signal into DC input voltage Vin.

In this example, the power stage circuit is a flyback topology including transformer T, main switch Sm coupled in series with a primary winding of transformer T, and diode D1 and output capacitor Co both coupled in series with a secondary winding of transformer T. A dotted end of the primary winding of transformer T can connect to a first end of main switch Sm. A non-dotted end of the primary winding of transformer T can connect to input capacitor Cin to obtain DC input voltage Vin. A second end of main switch Sm may be grounded. A dotted end of the secondary winding of transformer T can connect to the anode of diode D1. Output capacitor Co can connect between the cathode of diode D1 and a non-dotted end of the secondary winding of transformer T. DC output voltage Vout may be obtained across output capacitor Co. In one example, the power stage circuit is a forward topology to form an active-clamp forward circuit. In other examples, the power stage circuit can be another type of topology to form a suitable type of switching converter.

In particular embodiments, the clamp circuit may be coupled in parallel with the primary winding of transformer T. The clamp circuit can include auxiliary switch Sa and clamp capacitor Cc, and auxiliary switch Sa may be coupled in series with clamp capacitor Cc. In this example, the primary winding of transformer T may be equivalent to excitation inductance Lm and leakage inductance Lk, and excitation inductance Lm can be coupled in series with leakage inductance Lk. The control circuit may respectively be coupled to main switch Sm and auxiliary switch Sa, and can control main switch Sm and auxiliary switch Sa to turn on and turn off.

When the active-clamp flyback circuit operates in a normal mode, main switch Sm may alternately be turned on and off. During the on-state of main switch Sm, primary current Ip can flow through the primary winding of transformer T. Primary current Ip can gradually increase as the on-time of main switch Sm increases, such that transformer T stores energy, and diode D1 coupled to the secondary winding of transformer T may be turned off due to reverse bias. During the off-state of main switch Sm, primary current Ip flowing through the primary winding of transformer T can be reduced to zero, and diode D1 coupled to the secondary winding of transformer T may be turned on due to forward bias. Thus, transformer T can release energy in order to supply power to output capacitor Co and a load.

During the off-state of main switch Sm, auxiliary switch Sa can be turned on for at least a period of time, such that the clamp circuit starts to work. The energy stored in leakage inductance Lk of transformer T may be released into clamp capacitor Cc through a body diode of auxiliary switch Sa, thereby suppressing the parasitic oscillation generated by leakage inductance Lk (i.e., suppressing generation of the spike voltage), in order to improve the electromagnetic interference (EMI) characteristic.

However, when the active-clamp flyback circuit operates in an over-voltage protection mode due to faults, the active-clamp flyback circuit may be prone to failure and may no longer operate in the normal mode. This is because, under the normal mode, the voltage of clamp capacitor Cc is about N*Vout, where N is a turns ratio of the primary winding and the secondary winding, and when the output voltage of the active-clamp flyback circuit is over-voltage, output voltage Vout is relatively large, such that clamp voltage Vcc of clamp capacitor Cc is relatively large. When over-voltage protection starts due to faults such as over-voltage of the output voltage of the active-clamp flyback circuit, both main switch Sm and auxiliary switch Sa may be turned off, such there is no discharge circuit for clamp capacitor Cc, and clamp voltage Vcc of clamp capacitor Cc drops slowly while output voltage Vout of the active-clamp flyback circuit is quickly pulled down by the load.

When over-voltage protection is cleared or restarted, the voltage of primary winding may be relatively low due to the low output voltage Vout. When auxiliary switch Sa is turned on, the voltage of leakage inductance Lk equal to a voltage difference between clamp voltage Vcc of clamp capacitor Cc and the voltage of primary winding may be high. Also, the inductance value of leakage inductance Lk may be relatively small, such a relatively large loop current flowing through primary winding may be generated according to the relationship between inductance voltage and current (e.g., Ldi/dt=u). In addition, the peak current of secondary diode D1 may be relatively large, and therefore the auxiliary switch Sa and secondary diode D1 can possibly be damaged.

In particular embodiments, a control circuit may be provided for the switching converter, and when a system operates in an over-voltage protection mode (i.e., over-voltage protection of a system begins), the control circuit can control main switch Sm to remain off. In addition, auxiliary switch Sa can be controlled to continue to operate for a predetermined number of operating cycles, such that clamp capacitor Cc is quickly discharged. In this way, damage to auxiliary switch Sa and secondary diode D1 may be substantially.

Figure 3:
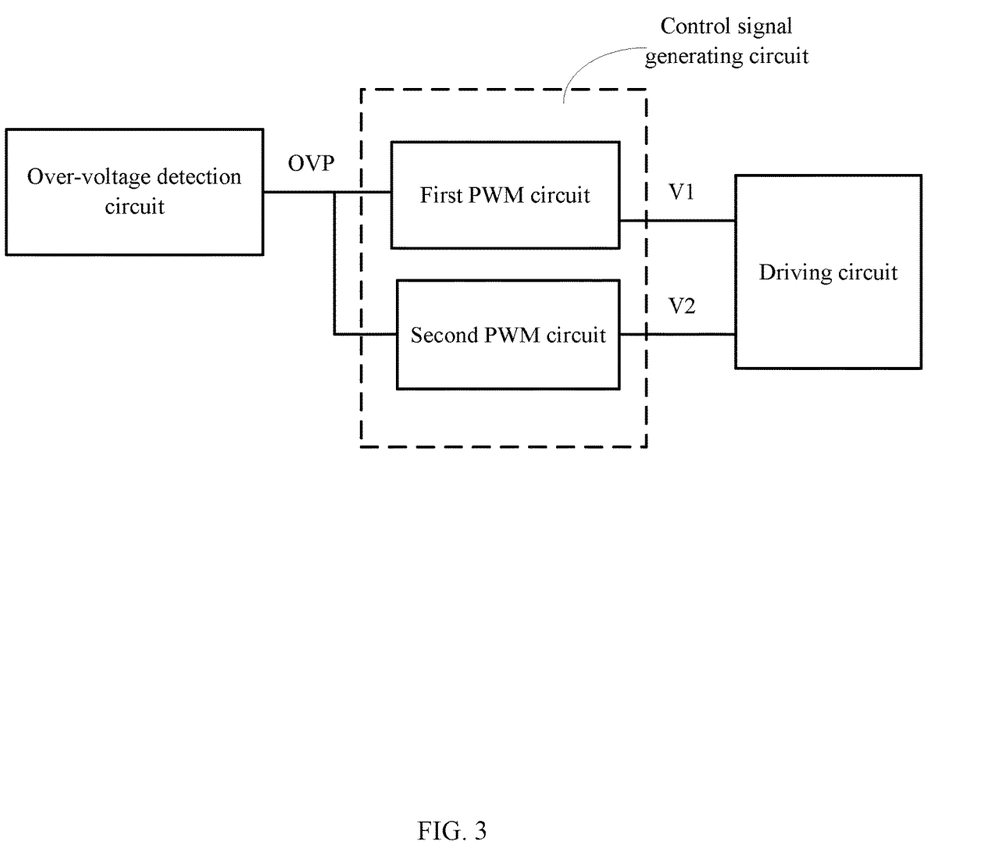
FIG. 3 is a schematic block diagram of an example control circuit, in accordance with embodiments of the present invention.

Referring now to FIG. 3, shown is a schematic block diagram of an example control circuit, in accordance with embodiments of the present invention. In this particular example, the control circuit can include an over-voltage detection circuit, a control signal generating circuit, and a driving circuit. Here, the over-voltage detection circuit can detect output voltage Vout, and may determine whether output voltage Vout is greater than an over-voltage threshold in order to generate over-voltage detection signal OVP. Over-voltage detection signal OVP may represent whether over-voltage protection of the system has started or not. For example, over-voltage protection of the system being started can be determined based on when over-voltage detection signal OVP is active, and correspondingly over-voltage protection of the system can be determined as not started when over-voltage detection signal OVP is inactive.

The control signal generating circuit can select different pulse-width modulation (PWM) circuits according to the over-voltage detection signal OVP, to generate a corresponding PWM control signal. Further, the control signal generating circuit can include first and second PWM circuits. The first PWM circuit can be enabled when over-voltage detection signal OVP is inactive, in order to activate PWM control signal V1 to make the system work normally. The second PWM circuit can be enabled when over-voltage detection signal OVP is active, in order to activate PWM control signal V2 to make clamp capacitor Cc discharge quickly when over-voltage protection of the system starts.

The driving circuit can generate a driving signal according to the PWM control signals (e.g., PWM control signal V1 and/or V2) to drive main switch Sm and auxiliary switch Sa to be turned on and off. Alternatively, auxiliary switch Sa can operate at a preset frequency or a present duty cycle when over-voltage protection of the system has started. For example, auxiliary switch Sa can be turned on and off with a preset duty cycle and a preset frequency when over-voltage protection of the system has started. The peak value of the resonant current can be controlled within a suitable range by selecting a suitable frequency and a suitable duty cycle, in order to prevent the device (e.g., auxiliary switch Sa) from being damaged. While auxiliary switch Sa can operate at a preset fixed duty cycle and/or a present frequency when over-voltage protection of the system has started, other possible control methods can alternatively be utilized in certain embodiments, such as whereby the preset frequency can be fixed or not, and the preset duty cycle can be fixed or not.

Figure 4:
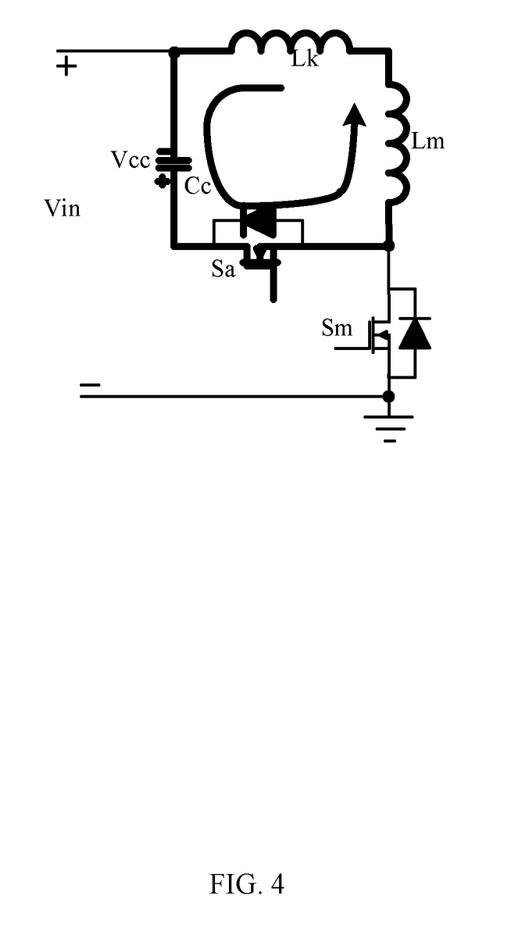
FIG. 4 is a schematic block diagram of a first example discharge loop for the clamp capacitor, in accordance with embodiments of the present invention.
Figure 5:
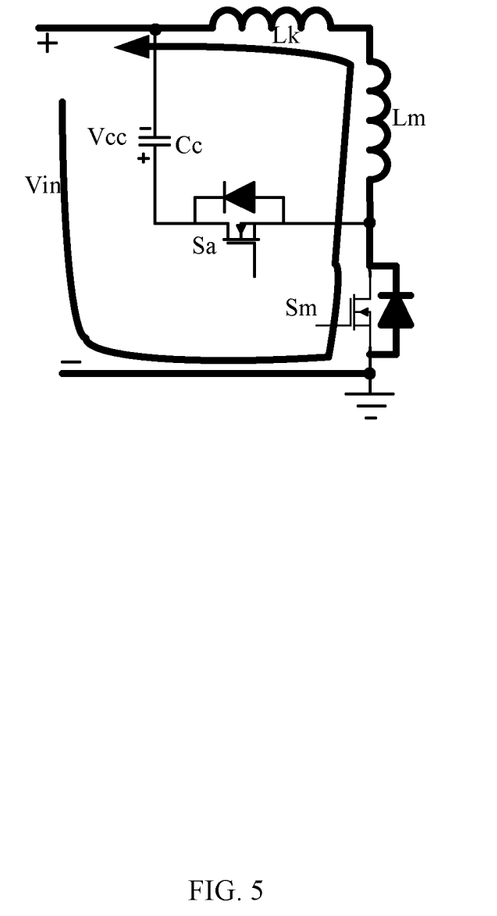
FIG. 5 is a schematic block diagram of a second example discharge loop for the clamp capacitor, in accordance with embodiments of the present invention.
Figure 6:
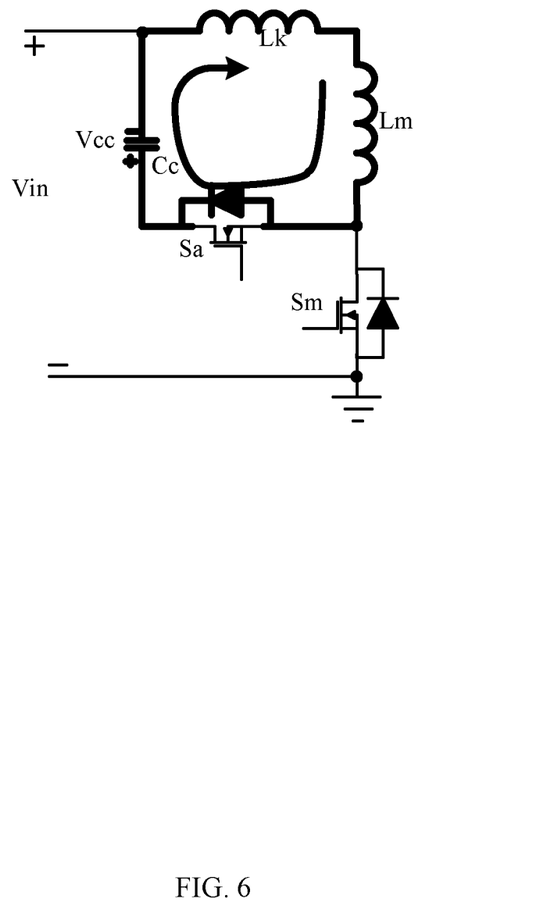
FIG. 6 is a schematic block diagram of a third example discharge loop for the clamp capacitor, in accordance with embodiments of the present invention.
Figure 7:
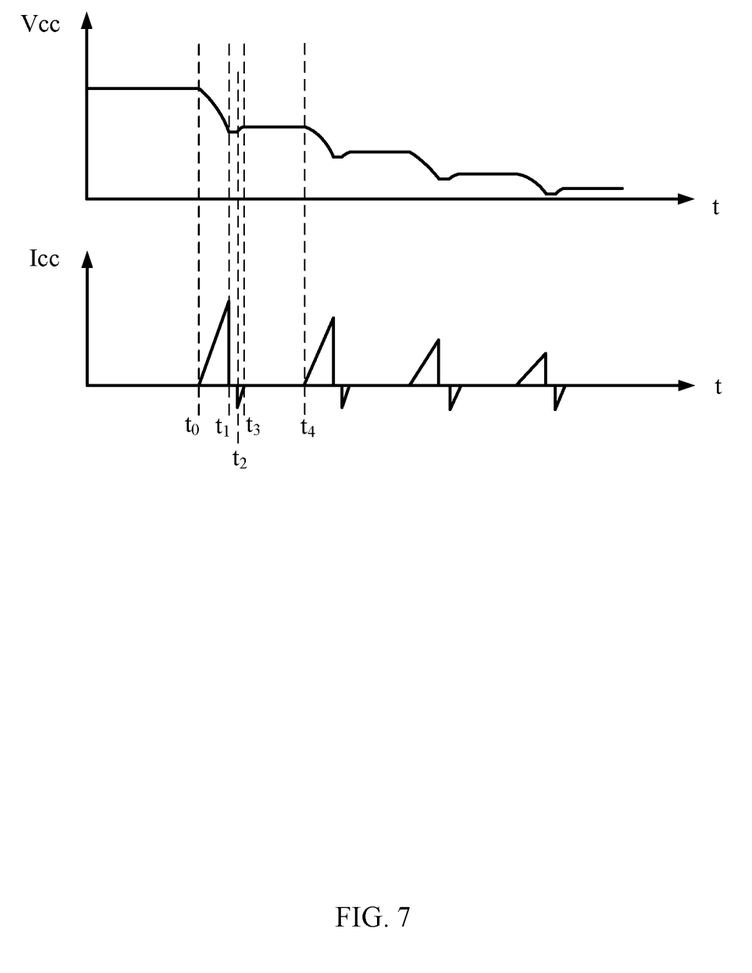
FIG. 7 is a waveform diagram of example operation of an active-clamp flyback circuit, in accordance with embodiments of the present invention.

Referring now to FIGS. 4-6, shown are schematic block diagrams of example discharge loops for the clamp capacitor, in accordance with embodiments of the present invention. Referring also to FIG. 7, shown is a waveform diagram of example operation of an active-clamp flyback circuit, in accordance with embodiments of the present invention. Combined with the operation waveform diagram shown in FIG. 7, example discharge processes of clamp capacitor Cc when over-voltage protection of the system has started are shown.

During the period t0-t1 of FIG. 7, corresponding to the first discharge loop for the clamp capacitor shown in FIG. 4, when over-voltage protection of the system has started, main switch Sm can remain off and auxiliary switch Sa can be turned on. Also, clamp capacitor Cc may resonate with primary excitation inductance Lm in order to generate the first discharge loop for the clamp capacitor. The loop current of the first discharge loop can flow from a common point of clamp capacitor Cc and auxiliary switching tube Sa, through auxiliary switching tube Sa, and then through excitation inductance Lm to the other end of clamp capacitor Cc. Also, during this process, clamp voltage Vcc of clamp capacitor Cc may gradually decrease.

During the period t1-t2 of FIG. 7, corresponding to the second discharge loop for the clamp capacitor shown in FIG. 5, auxiliary switch Sa can be turned off after being turned on for a certain period of time according to the preset frequency and/or the preset duty cycle. At this time, the loop current may not be abruptly changed due to the presence of excitation inductance Lm. Thus, the flow direction of loop current may not change until the loop current is reduced to zero. The loop current can flow through the second discharge loop for clamp capacitor Cc shown in FIG. 5. That is, the loop current may flow from the parasitic body diode of main switch Sm, and through excitation inductance Lm to input source Vin. During this process, the loop current can decrease linearly, but clamp voltage Vcc of clamp capacitor Cc may remain unchanged. Also, the current that flows through clamp capacitor Cc may be zero because the loop current does not flow through clamp capacitor Cc.

During the period t2-t3 of FIG. 7, main switch Sm and auxiliary switch Sa can remain off. When the loop current is reduced to zero, excitation inductance Lm can resonate with the parasitic capacitors of auxiliary switch Sa and main switch Sm. Thus, the voltage of the parasitic capacitor of auxiliary switch Sa can decrease, and the voltage of the parasitic capacitor of main switch Sm can increase. When the voltage of the parasitic capacitor of auxiliary switch Sa is zero, the parasitic body diode of auxiliary switch Sa may be turned on, and the flow direction of the loop current can be reversed, in order the third discharge loop for the clamp capacitor as shown in FIG. 6. Clamp capacitor Cc can be charged until the loop current is zero.

During the period t3-t4 of FIG. 7, clamp voltage Vcc of clamp capacitor Cc may remain unchanged. Then, the active-clamp flyback circuit can start operating in the next cycle. In this way, clamping voltage Vcc of clamping capacitor Cc may be reduced to a low value after a predetermined number of operating cycles. Thus, when over-voltage protection of system is cleared or restarted, the voltage of leakage inductance Lk equal to a voltage difference between clamp voltage Vcc of clamp capacitor Cc and the voltage of primary winding may not be high anymore, and a relatively large loop current through primary winding may not be generated. As such, there is no risk of damaging auxiliary switch Sa and secondary diode D1.

In particular embodiments, when over-voltage protection of a system starts, the control circuit can control main switch Sm to remain off, and can control auxiliary switch Sa to continue to operate for a predetermined number of operating cycles, which may provide a discharge path for clamp capacitor Cc. Thus, clamp capacitor Cc can be quickly discharged, and the damage to auxiliary switch Sa and secondary diode D1 can be substantially avoided. In this approach, it is not necessary to provide a discharge circuit by adding a large resistor coupled in parallel with clamp capacitor Cc, and thus the no-load loss of the switching converter can be reduced.

Figure 8:
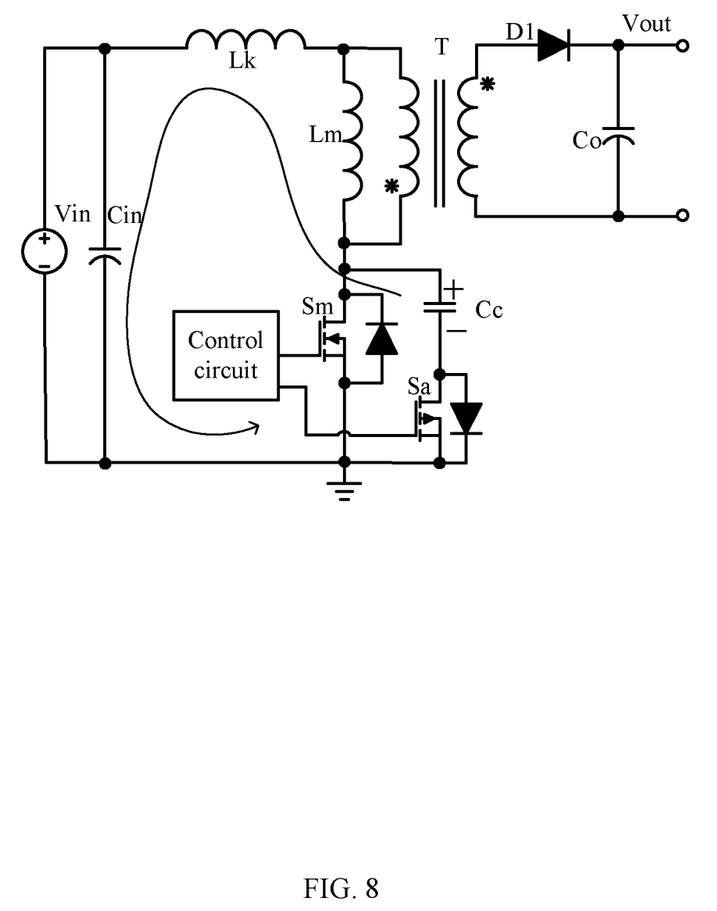
FIG. 8 is a schematic block diagram of a second example active-clamp flyback circuit, in accordance with embodiments of the present invention.

Referring now to FIG. 8, shown is a schematic block diagram of a second example active-clamp flyback circuit, in accordance with embodiments of the present invention. In this particular example, the clamp circuit can be coupled in series with the primary winding of transformer T, and the clamp circuit can be coupled in parallel with main switching tube Sa. Also, the discharge loops for clamp capacitor Cc are different due to the different structure of this example. Referring again to FIG. 7, shown is a waveform diagram of example operation of an active-clamp flyback circuit, in accordance with embodiments of the present invention. Combined with the operation waveform diagram shown in FIG. 7, discharge processes of clamp capacitor Cc when over-voltage protection of the system has started are shown.

During the period t0-t1 of FIG. 7, when over-voltage protection of the system has started, main switch Sm may remain off and auxiliary switch Sa can be turned on. Also, clamp capacitor Cc can resonate with primary excitation inductance Lm in order to generate the first discharge loop for clamp capacitor. The loop current of the first discharge loop can flow from a common point of clamp capacitor Cc and excitation inductance Lm, through excitation inductance Lm, and then through input source Vin and auxiliary switch Sa to the other end of clamp capacitor Cc. Also, during this process, clamp voltage Vcc of clamp capacitor Cc may gradually decrease.

During the period t1-t2 of FIG. 7, auxiliary switch Sa can be turned off after being turned on for a certain period of time according to the preset frequency and/or the preset duty cycle. At this time, the loop current may not be abruptly changed due to the presence of excitation inductance Lm. Thus, the flow direction of loop current may not change until the loop current is reduced to zero. The loop current can flow from the parasitic body diode of main switch Sm, and through excitation inductance Lm to input source Vin. During this process, the loop current can decrease linearly, but clamp voltage Vcc of clamp capacitor Cc may remain unchanged. Also, the current that flows through clamp capacitor Cc may be zero because the loop current does not flow through clamp capacitor Cc.

During the period t2-t3 of FIG. 7, main switch Sm and auxiliary switch Sa can remain off. When the loop current is reduced to zero, excitation inductance Lm can resonate with the parasitic capacitors of auxiliary switch Sa and main switch Sm, such that the voltage of the parasitic capacitor of auxiliary switch Sa decreases, and the voltage of the parasitic capacitor of main switch Sm increases. When the voltage of the parasitic capacitor of auxiliary switch Sa is zero, the parasitic body diode of auxiliary switch Sa can be turned on, and the flow direction of the loop current may be reversed. The loop current can flow from a common point of clamp capacitor Cc and auxiliary switch Sa, through the body diode of auxiliary switch Sa, and then through input source Vin and excitation inductance Lm to a common point of clamp capacitor Cc and excitation inductance Lm. Clamp capacitor Cc can be charged until the loop current is zero.

During the period t3-t4 of FIG. 7, clamp voltage Vcc of clamp capacitor Cc may remain unchanged. Then, the active-clamp flyback circuit can start operating in the next cycle. In this way, clamping voltage Vcc of the clamping capacitor Cc may be reduced to a low value after a predetermined number of operating cycles. Thus, when over-voltage protection of the system is cleared or restarted, the voltage of leakage inductance Lk equal to a voltage difference between clamp voltage Vcc of clamp capacitor Cc and the voltage of primary winding may not be high anymore. Also, a large loop current through primary winding may not be generated, and therefore there is no risk of damaging auxiliary switch Sa and secondary diode D1.

In the control circuit of particular embodiments, when over-voltage protection of a system has started, the control circuit can control main switch Sm to remain off, and can control auxiliary switch Sa to continue to operate for a predetermined number of operating cycles, which may provide a discharge path for clamp capacitor Cc. Thus, clamp capacitor Cc may quickly be discharged, and potential damage to auxiliary switch Sa and secondary diode D1 can be substantially avoided. In certain embodiments, since it is not necessary to provide a discharge circuit by adding a large resistor coupled in parallel with clamp capacitor Cc, the no-load loss of the switching converter can be reduced. In addition, the control circuit of particular embodiments can also be applied to a forward converter to form an active-clamp forward circuit.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. An apparatus, comprising:
   a) a switching converter having a main switch configured to provide power to a transformer, an auxiliary switch configured to provide a release path for leakage inductance energy of the transformer, and a clamp capacitor coupled directly connected in series with the auxiliary switch; and
   b) a control circuit configured to control the main switch to be off and the auxiliary switch to operate to discharge the clamp capacitor when in an over-voltage protection mode, wherein the control circuit is not directly connected to the clamp capacitor.

2. The apparatus of claim 1, wherein the auxiliary switch is controlled to operate for a predetermined number of operating cycles.

3. The apparatus of claim 1, wherein a voltage of the clamp capacitor is decreased to be a preset value after a predetermined number of operating cycles.

4. The apparatus of claim 1, wherein the auxiliary switch is configured to operate at a preset frequency when in the over-voltage protection mode.

5. The apparatus of claim 4, wherein the auxiliary switch is configured to be turned on and off with a preset duty cycle when in the over-voltage protection mode.

6. The apparatus of claim 1, wherein:
   a) the control circuit comprises an over-voltage detection circuit for generating an over-voltage detection signal according to an output voltage of the switching converter; and
   b) the over-voltage detection signal is used to indicate a status of the over-voltage protection mode.

7. The apparatus of claim 1, wherein the control circuit further comprises a control signal generating circuit to generate different pulse-width modulation (PWM) control signals based on whether in the over-voltage protection mode.

8. The apparatus of claim 7, wherein the control signal generating circuit comprises:
   a) a first PWM circuit configured to generate a first PWM control signal to control the main switch and the auxiliary switch in a normal mode; and
   b) a second PWM circuit configured to generate a second PWM control signal to control the main switch and the auxiliary switch in the over-voltage protection mode.

9. The apparatus of claim 1, wherein the clamp capacitor is coupled in series with the auxiliary switch to form a clamp circuit.

10. The apparatus of claim 9, wherein the clamp circuit and a primary winding of the transformer are coupled in parallel.

11. The apparatus of claim 9, wherein the clamp circuit and a primary winding of the transformer are coupled in series.

12. The apparatus of claim 1, wherein a power stage circuit of the switching converter is configured as a flyback topology.

13. The apparatus of claim 1, wherein a power stage circuit of the switching converter is configured as a forward topology.

14. A method of controlling a switching converter comprising a main switch configured to provide power to a transformer, an auxiliary switch configured to provide a release path for leakage inductance energy of the transformer, and a clamp capacitor directly connected in series with the auxiliary switch, the method comprising:
   a) controlling, by a control circuit, the main switch to be off; and
   b) controlling, by the control circuit, the auxiliary switch to operate to discharge the clamp capacitor when in an over-voltage protection mode, wherein the control circuit is not directly connected to the clamp capacitor.

15. The method of claim 14, wherein the auxiliary switch is controlled to operate for a predetermined number of operating cycles.

16. The method of claim 14, wherein a voltage of the clamp capacitor is decreased to be a preset value after a predetermined number of operating cycles.

17. The method of claim 14, wherein the auxiliary switch is configured to operate at a preset frequency when in the over-voltage protection mode.

18. The method of claim 14, wherein the auxiliary switch is configured to be turned on and off with a preset duty cycle when in the over-voltage protection mode.

\* \* \* \* \*